United States Patent
Del Signore

(10) Patent No.: US 9,049,683 B2
(45) Date of Patent: Jun. 2, 2015

(54) ADAPTIVE USER EQUIPMENT REGISTRATION FOR COMMUNICATION NETWORKS

(75) Inventor: Kenneth W. Del Signore, North Aurora, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 526 days.

(21) Appl. No.: 13/224,927

(22) Filed: Sep. 2, 2011

(65) Prior Publication Data

US 2013/0059582 A1 Mar. 7, 2013

(51) Int. Cl.
*H04W 4/00* (2009.01)
*H04W 60/04* (2009.01)

(52) U.S. Cl.
CPC .................................. *H04W 60/04* (2013.01)

(58) Field of Classification Search
CPC ........... H04W 4/00; H04W 8/02; H04W 8/04; H04W 8/06; H04W 8/08; H04W 8/16
USPC ....................................... 455/435.1; 370/338
See application file for complete search history.

(56) References Cited

U.S. PATENT DOCUMENTS

| | | |
|---|---|---|
| 2008/0268878 A1 | 10/2008 | Wang et al. |
| 2008/0280608 A1 | 11/2008 | Yu et al. |
| 2010/0075698 A1 | 3/2010 | Rune et al. |
| 2010/0165927 A1 | 7/2010 | Kim et al. |
| 2011/0190010 A1* | 8/2011 | Cho .............................. 455/458 |
| 2012/0115515 A1* | 5/2012 | Lopez et al. .................. 455/458 |

FOREIGN PATENT DOCUMENTS

GB 2449228 A * 11/2008 ............ H04W 60/00

* cited by examiner

*Primary Examiner* — Marcos Batista
(74) *Attorney, Agent, or Firm* — Wolff & Samson PC

(57) ABSTRACT

A method, apparatus, and computer-readable medium for registration of a mobile communication device include receiving a tracking area update request from the mobile communication device. Determining if the mobile communication device is categorized as moving or stationary. Categorizing the mobile communication list as one of moving or stationary based on the tracking area update request. Transmitting a tracking area list and a timer value to the mobile communications device based on the categorizing of the mobile communication device and the tracking area update request. The tracking area list and timer value can also be based on other factors.

21 Claims, 8 Drawing Sheets

US 9,049,683 B2

ADAPTIVE USER EQUIPMENT REGISTRATION FOR COMMUNICATION NETWORKS

FIELD OF INVENTION

The present disclosure relates generally to communication networks, and more particularly to adaptive user equipment registration for Long Term Evolution networks.

BACKGROUND

Communication networks operate with a finite amount of bandwidth. The number of devices communicating over a network generally increases until the bandwidth of the network is totally utilized.

Traffic over a communication network includes voice and data for user communications as well as additional data for administrative functions such as registration and paging. Since the bandwidth of a communication network is finite, techniques for decreasing the amount of bandwidth used for administrative purposes are desirable.

SUMMARY

The present disclosure provides a method and apparatus for adaptive user equipment registration for Long Term Evolution Networks.

In one embodiment, a method for registration of a mobile communication device comprises receiving a tracking area update request from the mobile communication device and determining whether the mobile communication device is categorized as moving or stationary. The mobile communication device is then categorized based on the tracking area update request. A tracking area list and a timer value are transmitted to the mobile communication device. The tracking area list and the timer value transmitted to the mobile communication device are based on the tracking area update request and the categorizing of the mobile communications device as moving or stationary.

In some embodiments the tracking area list identifies a plurality of network nodes based on the categorizing. In some embodiments, the tracking area list, timer value, and categorization can be based on various factors. The tracking area list and the timer value can be based on a time period from a previous categorization of the mobile communications device to a time the tracking area update request was received. The categorization of the mobile communication device can be based on a previous categorization of the device. The tracking area list can be based on a previous tracking area list transmitted to the mobile communication device. The tracking area list can be based on a path previously traversed by the mobile communications device. The timer value can be based on an average time for a particular mobile communications device to travel to a border of a large registration area in which the mobile communication device is located.

An apparatus for performing the above method and a computer-readable medium storing instructions for causing a computing device to perform operations similar to the above method are also disclosed.

These and other advantages of the invention will be apparent to those of ordinary skill in the art by reference to the following detailed description and the accompanying drawings.

DETAILED DESCRIPTION

Figure 1:
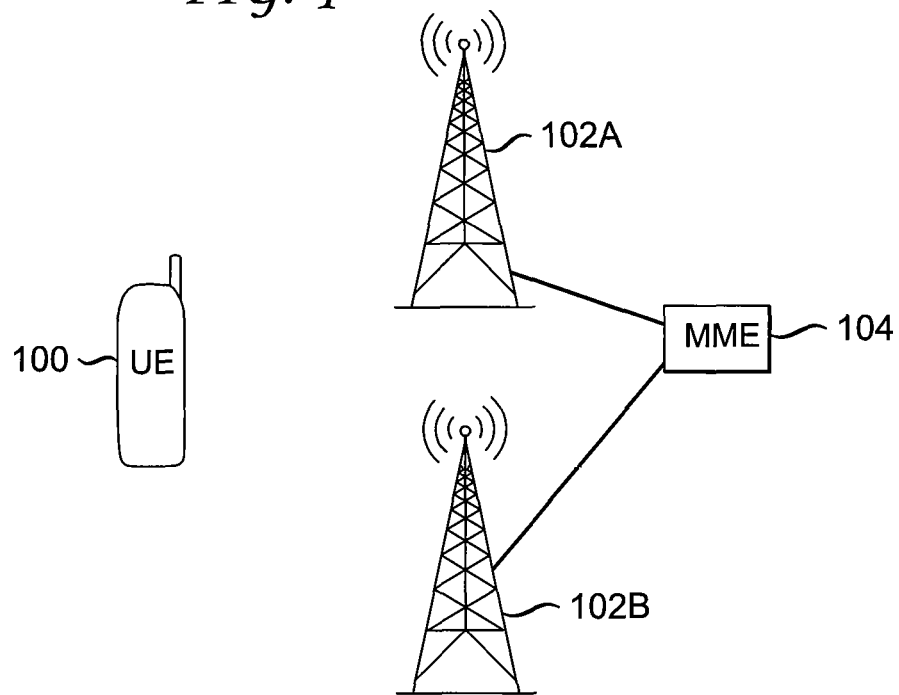
FIG. 1 depicts a schematic of a communication network.

FIG. 1 depicts a communication network comprising user equipment 100, communication nodes 102A, 102B, and a Mobile Management Entity (MME) 104. User equipment (UE) 100 is a wireless mobile communication device such as a cell phone, PDA, or other mobile communication device. UE 100 is in communication with one or more communication nodes 102A, 102B. A communication node is a transceiver for communicating with one or more mobile communication devices, such as UE 100. A communication node in one embodiment is an evolved Node b (eNb). Communication nodes 102A and 102B are in communication with Mobility Management Entity (MME) 104 which, in one embodiment, acts as a control node and is configured to facilitate registration and paging operations. As user equipment 100 is moved, it travels through areas covered by one or more communication nodes 102A, 102B.

Paging and registration operations are required to facilitate the transmission of messages between UE 100 and communication nodes (e.g., 102A and 102B). To achieve efficient paging and registration, in methods described herein user equipment is categorized as moving or stationary. Stationary user equipment is given smaller registration areas (e.g., three cells, also known as sectors, each associated with a communications node) to minimize paging. Moving user equipment is given larger registration areas (e.g., sixty cells sectors) to minimize Tracking Area Updates (TAUs).

Figure 2:
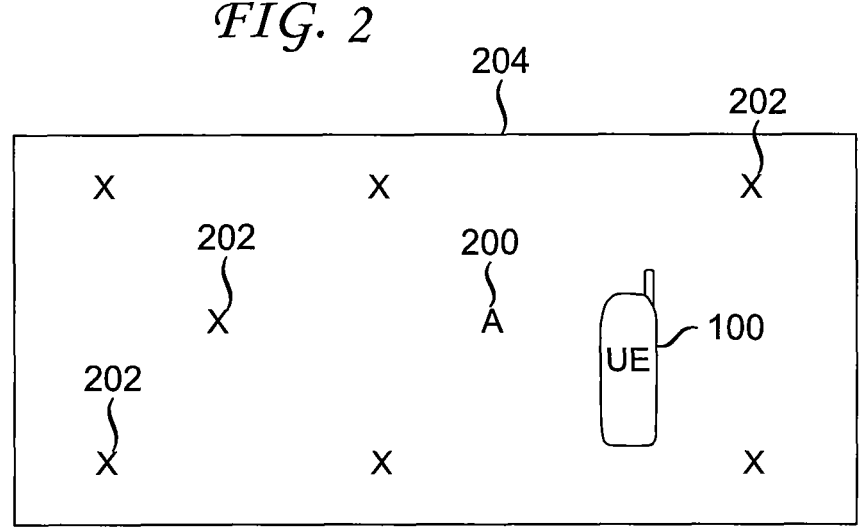
FIG. 2 depicts user equipment in a communication network.

FIG. 2 depicts an arrangement in which communication nodes are grouped into tracking areas which are further grouped into registration areas. User equipment 100 is located in large registration area 204 in which multiple tracking areas (TAs) 202 are located. TAs 202 are formed by grouping 1 to n communication nodes (e.g., 102A, 102B of FIG. 1) locally. Communication nodes, in one embodiment, are associated with one or more TAs 202, for example, when a communication node is located adjacent to two TAs 202. Communication nodes broadcast the TAs that they are associated with. FIG. 2 shows UE 100 in communication with tracking area (TA) A 200 which, in this embodiment, is comprised of several evolved Node Bs (eNbs).

UE 100 transmits a tracking area update (TAU) request at specific events, such as when UE 100 is turned on (i.e. powers on). The TAU request is received by a communications node of a tracking area, such as a communication node in TA A 200. The communications node receiving the request forwards it to an MME, such as MME 104 of FIG. 1. In response to the request, MME 104 transmits a Tracking Area List (TA_List) and a timer value to user equipment 100 via the receiving communication node of TA A 200. A TA_List contains a list of tracking area identifiers. The specific TA_List and timer value transmitted to UE 100 is based, in one embodiment, on a categorization of UE 100 as moving or stationary. The specific TA_List and timer value transmitted to UE 100 can be additionally based on other factors. UE 100 can move to and/or communicate with any communication node in the TA_List without re-registering. If UE 100 moves to and/or communicates with a communications node not listed in the TA_List currently stored in and utilized by UE 100, it will register with MME 104 via a TAU request. Since UE 100 stores a TA_List corresponding to its current location, UE 100 should always respond to network paging via one of the communications nodes included in the TA_List currently stored in and utilized by UE 100. Paging messages for UE 100 are only transmitted by the communications nodes belonging to the TA_List that was last sent to UE 100.

Figure 3:
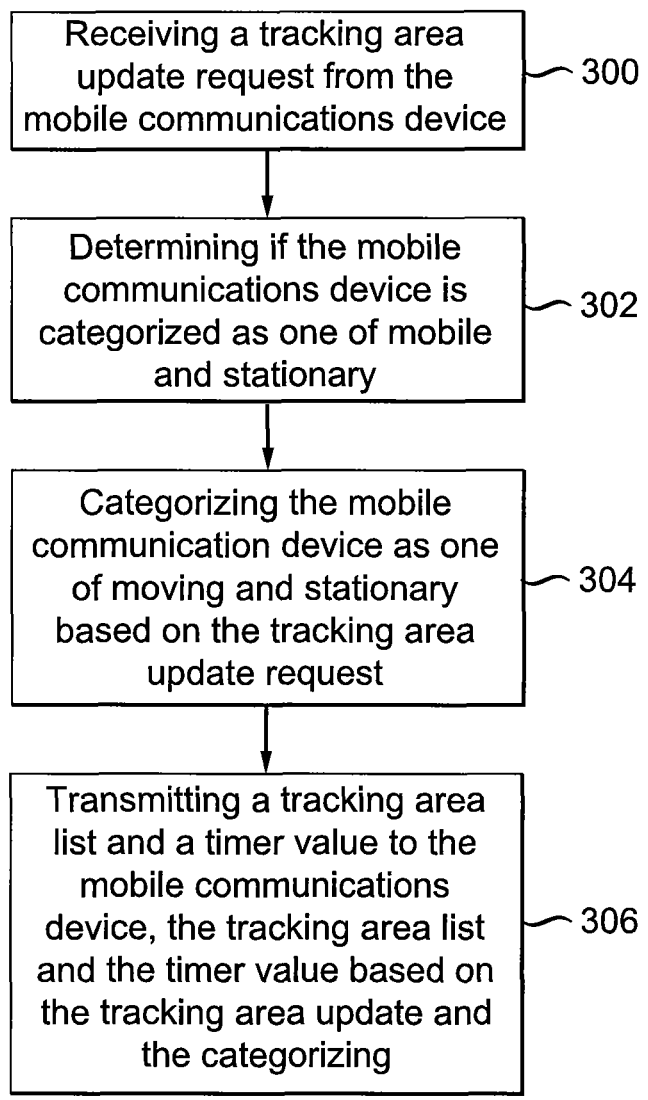
FIG. 3 depicts a flowchart of a method according to one embodiment.

FIG. 3 depicts a flow chart according to one embodiment in which MME 104 of FIG. 1 receives and responds to a tracking area update request from a mobile communication device such as UE100 of FIG. 1. At step 300, MME 104 receives a tracking area update (TAU) request from UE 100 via a communications node (e.g. a communication node in TA A 200). At step 302, MME 104 determines if the mobile communication device (i.e., UE 100) is categorized as moving or stationary, by which we mean that UE 100 is placed in one of only two possible categories, namely 'moving' and 'stationary'. At step 304, MME 104 categorizes UE 100 as moving or stationary based on the tracking area update request. At step 306, MME 104 transmits a tracking area list (TA_List) and a timer value to UE 100, the tracking area list and the timer value based on the tracking area update and the categorizing.

The categorization of a mobile communication device, in this example UE 100, is determined based on various factors. UE 100 registers with MME 104 by transmitting one of two kinds of tracking area update requests. A time based Tracking Area Update (tb-TAU) request is transmitted from UE 100 in response to the expiration of a timer running on UE 100. A zone based Tracking Area Update (zb-TAU) request is transmitted from UE 100 in response to UE 100 moving to an area where it is in communication with a particular communication node that is not listed in a Tracking Area List (TA_list) currently stored in and utilized by UE 100. A request transmitted from UE 100 is received by the particular communication node and transmitted to MME 104. In this scenario, UE 100 is in communication with the particular communication node but the particular communication node is not included in the TA_List currently stored in and utilized by UE 100. In response to the request, a new TA_List is transmitted to UE 100 via a communication node with which UE 100 is in communication. The tracking area list and timer value can also be based on various factors such as, for example, a time period from a previous categorization of UE 100 to a time the tracking area update request was received, a previous categorization of UE 100, a previous tracking area list transmitted to UE 100, a path previously traversed by UE 100, and an average time for a particular mobile communication device to travel to a border of a large registration area in which the mobile communication device is located.

The categorization of UE 100 can occur in any of various scenarios. The various scenarios are, e.g. when UE 100 powers on, when UE 100 is in motion, when the state (also referred to as category) of UE 100 transitions from "moving" to "stationary", when stationary UE 100 toggles to a border TA, and when the state of UE 100 transitions from "stationary" to "moving".

The scenario of UE 100 powering on will be described in connection with FIGS. 1 and 2. UE 100 powers on and transmits a TAU to a communication node in TA A 200 which forwards the request to MME 104 (shown in FIG. 1). UE 100, in this embodiment, is not categorized as moving or stationary immediately after UE 100 powers on. Instead, MME 104 simply categorizes UE 100 as moving, by default. Since UE 100 is now categorized as moving, MME transmits a TA_List having a large registration area via a communication node in TA A 200. MME 104 also transmits a time based registration timer value specific to those UEs that have been categorized as "moving". Two different scenarios can occur after the UE has powered on, has been categorized as "moving", and has downloaded a TA_List and timer value. Specifically, UE 100, currently categorized as moving, can be subsequently determined to be moving or stationary.

Figure 4:
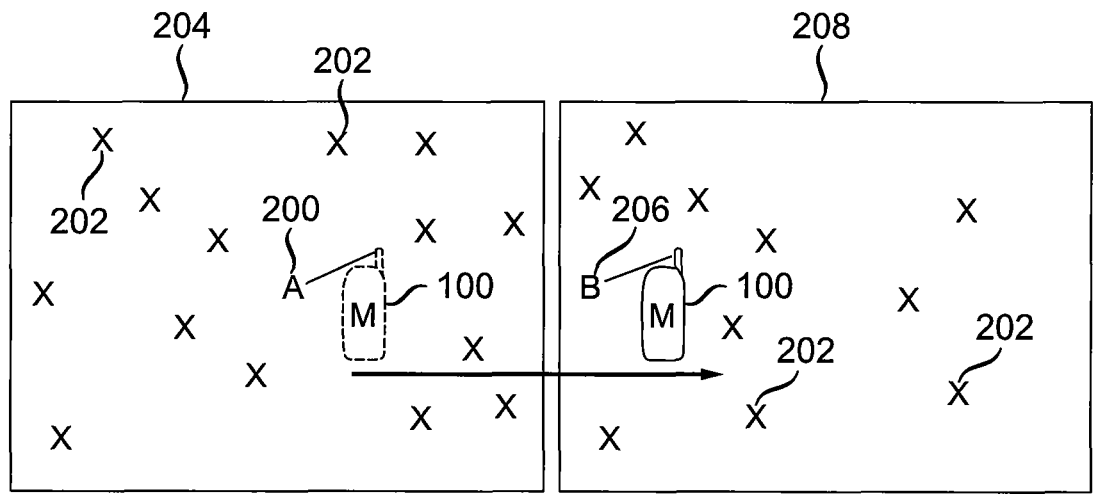
FIG. 4 depicts a mobile communication device travelling between two large registration areas.

FIG. 4 depicts the case when mobile communication device 100 is currently categorized as moving and is shown traveling from large registration area 204 (UE 100 shown in phantom) to large registration area 208. UE 100 is shown having an "M" indicating that UE 100 is currently categorized as moving. UE 100 moves or transitions to a communication node in tracking area (TA) B 206 and determines that TA B 206 is not listed in the tracking area list (TA_List) currently stored and utilized by UE 100. In response, UE 100 transmits a zone based tracking area update (zb-TAU) request. It should be noted that a zone based tracking area update request was transmitted from UE 100 and not a time based tracking area update request. A zone based tracking area update request was transmitted because UE 100 determined it was in an area covered by communications nodes in TA B 206 prior to the expiration of a time based registration timer running on UE 100. A communication node in TA B 206 transmits the zb-TAU request from UE 100 to MME 104 which, in response, transmits a new TA_List and timer value. The new TA_List includes the plurality of tracking areas (TA B 206 and all TA X 202 located in large registration area 208) each of which comprises one or more communication nodes. A new timer value for a moving UE is also transmitted to UE 100. Since UE 100 transmitted a zb-TAU prior to expiration of the timer based registration timer in UE100, MME 104 considers UE 100 to be moving and the current categorization of UE 100 as moving is left unchanged.

Figure 5:
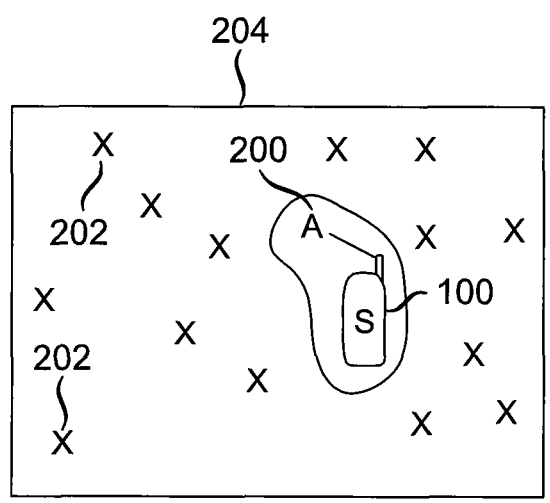
FIG. 5 depicts a mobile communication device in communication with a communication node associated with a tracking area.

FIG. 5 depicts the scenario in which a moving UE transitions to stationary. The moving timer based registration timer value downloaded to UE 100 is made long enough to allow most moving UEs to reach the border of a large registration area in which UE 100 is moving before the timer expires. When UE 100 is no longer in motion, the timer based registration timer expires before UE 100 encounters a communication node not included in the TA_List currently stored and utilized by UE 100. In response to the timer based registration timer expiring, UE 100 transmits a time based Tracking Area Update (tb-TAU) request. The request is received by MME 104 via a communication node UE 100 is in communication with. In response to the tb-TAU request from UE 100, MME 104 changes the categorization (also referred to as state) of UE 100 to stationary. MME 104 then downloads a TA_List comprised of communication nodes associated with tracking area A (TA A) 200 and a normal long time based registration timer value. The normal long time based registration value is larger than the value used for UEs categorized as moving. This is because a stationary UE is not expected to move beyond a coverage area associated with TA A 200 for some time.

If UE 100 continues to remain stationary after categorized as stationary, UE 100 will transmit tb-TAU requests when the time based registration timer expires. After UE 100 transitions to stationary it may transmit a zb-TAU due to two possibilities: stationary toggling or physical motion.

Figure 6A:
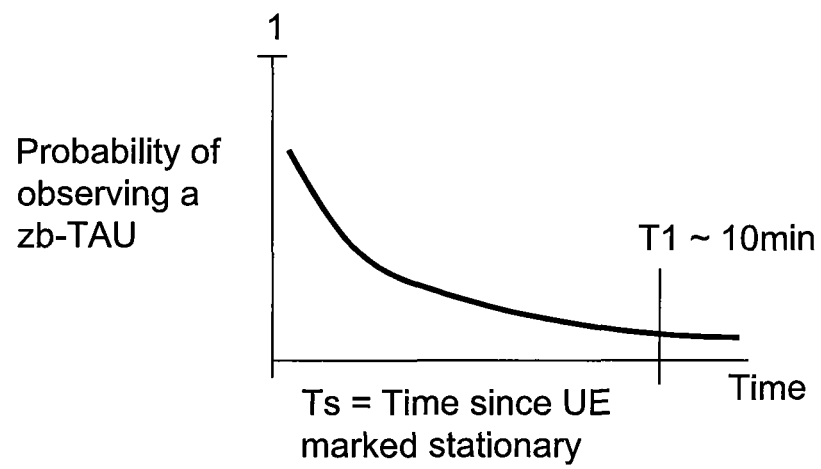
FIG. 6A depicts a graph of the probability of observing a mobile communication device transmitting a zone based tracking area update request as a function of time.

FIG. 6A depicts an estimated probability of observing UE 100 transmitting a zb-TAU request as a function of time. UE 100, in this scenario, is transmitting a zb-TAU request not because UE 100 is significantly moving, but rather due to stationary toggling. UE 100 stores and utilizes a TA_List that includes TA A 200. UE 100 is also in communication with TA B 210. For example, UE 100 may be receiving a stronger signal from a communication node associated with TA B 210 than from communication nodes in TA A 200. Alternatively, UE 100 may begin receiving a signal from a communication node in TA B 210. As depicted in FIG. 6A, it has been observed in typical networks that approximately 95% of UEs that can toggle, will toggle within approximately 10 minutes. A stationary toggling UE is not significantly moving and should not be classified as moving. Classifying a stationary toggling UE as moving would cause a TA_List having a large registration area to be downloaded to the UE which would increase bandwidth usage since it would cause paging messages to be transmitted between a large number of communication nodes (i.e., a large number of eNbs) and a particular UE. Since the particular UE is stationary toggling and not significantly moving, messages transmitted between the particular UE and a large number of communication nodes would be in excess of what is actually needed and thus a waste of bandwidth.

Figure 6B:
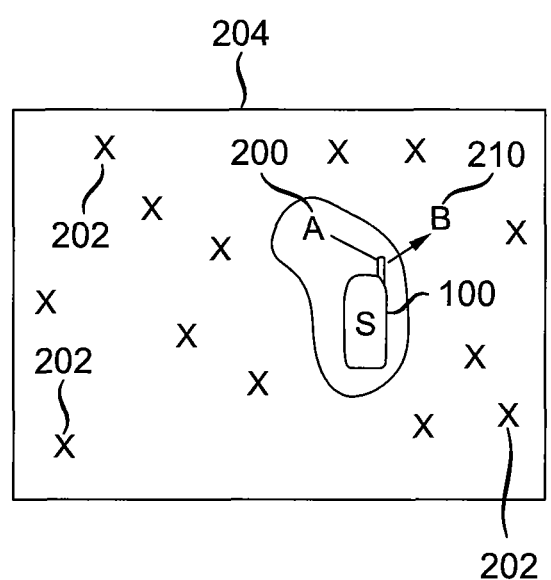
FIG. 6B depicts a mobile communication device associated with, two tracking areas.

FIG. 6B depicts UE 100 in communication with both TA A 200 and TA B 210. UE 100 has transmitted a zb-TAU request because it is in communication with a communication node in TA B 210 which is not included in the TA_List currently stored in and utilized by UE 100. Since UE 100 has transmitted a zb-TAU request less than ten minutes after the categorization of UE 100 as stationary, MME 104 transmits a TA_List including both TA A 200 and TA B 210, a normal long time based registration timer (e.g. 2 hours) and the categorization of UE 100 remains "stationary".

Figure 7A:
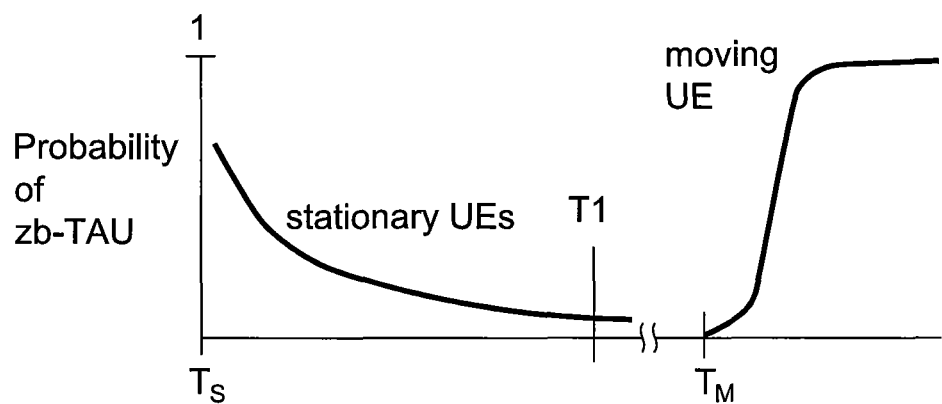
FIG. 7A depicts a graph of the probability of observing a mobile communication device transmitting a tracking area request as a function of time.
Figure 7B:
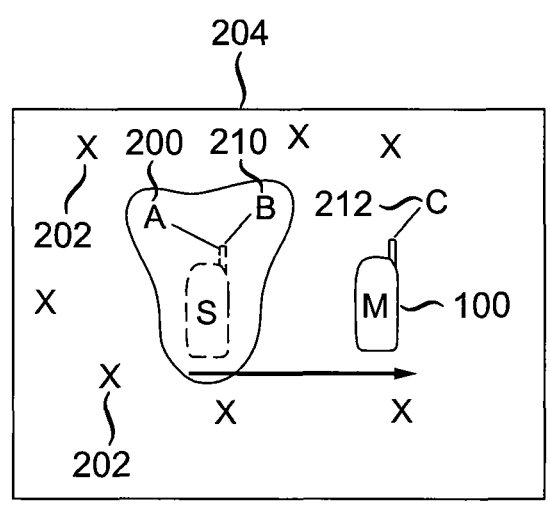
FIG. 7B depicts a mobile communication device moving from an area associated with two tracking areas to an adjacent tracking area.

UE 100 categorized as stationary may also transmit a zb-TAU request because UE 100 is moving. FIG. 7A depicts the probability of UE 100 transmitting a zb-TAU request as a function of time. As previously indicated above, in a typical network, a UE that can stationary toggle will do so in less than 10 minutes (i.e., T1 in FIG. 7A) from time TsubS, which is the time when UE was categorized as stationary. The probability of UE 100 transmitting a zb-TAU request will rise to 100% within some time after UE 100 begins to move at time TsubM, which can be any time after TsubS. For average movement patterns it is expected that TsubM>>T1. With this expectation, T1 can be used to distinguish whether a UE is moving or stationary. FIG. 7B depicts UE 100 (shown in phantom) previously categorized as stationary. UE 100 (shown in phantom and marked with an "S") stores and utilizes a TA_List including TA A 200 and TA B 210. UE 100 is categorized as moving (shown in FIG. 7B marked with an "M") after transmitting a zb-TAU request. The zb-TAU request transmitted from UE 100 is sent after UE 100 begins receiving signals from a communication node associated with TA C 212. The zb-TAU request is transmitted by UE 100 in response to a determination that communication nodes associated with TA C 212 are not included in the TA_List stored in and currently utilized by UE 100.

UE 100 can be miscategorized in one of two ways: stationary UE 100 miscategorized as moving and moving UE 100 miscategorized as stationary.

Figure 8:
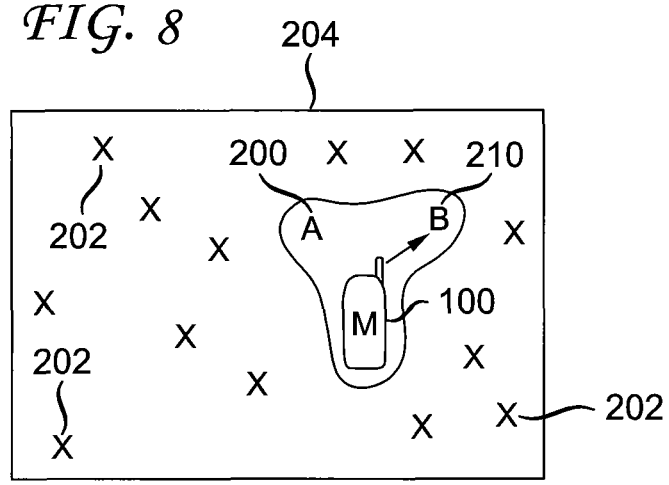
FIG. 8 depicts a mobile communication device associated with two tracking areas.

A stationary UE that stationary toggles to one or more nearby communication nodes (e.g., border TAs) not listed in the TA_list currently stored and utilized by the UE may be miscategorized as moving. The UE would then be categorized as moving and a large registration area and short moving timer would be transmitted to the UE. If the UE remains stationary, it will transmit a tb-TAU request in its previous registration area with high probability and be categorized as stationary. In order to prevent stationary UEs from cycling between a "stationary" categorization and a "moving" categorization, MME 104 can record the TAs the UE is observed to be in communication with while stationary. FIG. 8 depicts UE 100 enclosed in an area containing both TA A 200 and TA B 210. From previous interactions, MME 104 has identified UE 100 as being in communication with TA A 200 and TA B 210 while stationary in the enclosed area and has recorded this information. By transmitting a TA_List including both TA A 200 and TA B 210 when UE 100 transitions to stationary in the enclosed area, UE 100 will not cycle categorization so long as it remains in communication with any communication node in TA A 200 and TA B 210. By transmitting a TA_List including all TAs in a particular area that the UE has stationary toggled to previously, cycling of UE 100 between a "stationary" categorization and a "moving" categorization in the particular area is prevented.

Figure 9A:
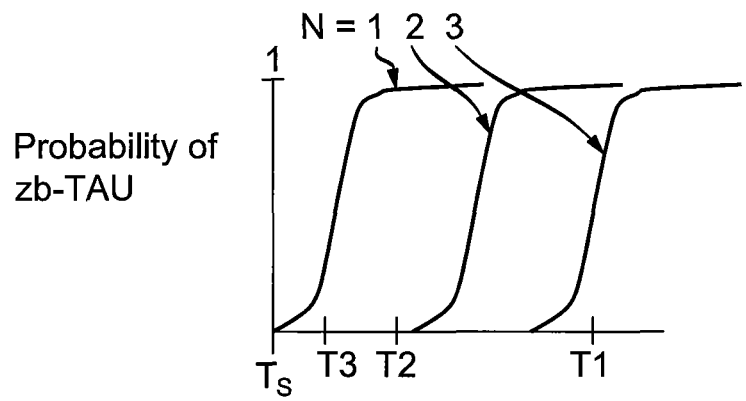
FIG. 9A depicts the probability of a mobile communication device transmitting multiple tracking area update requests as a function of time.
Figure 9B:
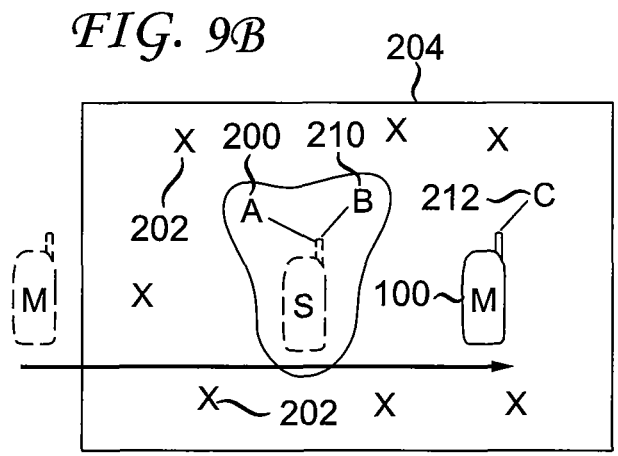
FIG. 9B depicts a moving mobile communication device associated with different tracking areas as it moves through a large registration area.

A moving UE can be miscategorized as stationary. This type of miscategorization can occur if a UE is still moving when the moving timer expired. It is expected that the UE will continue to transmit zb-TAU requests due to its motion. FIG. 9A depicts the probability of a moving UE transmitting zb-TAU requests after TsubS. It is expected that a moving UE will continue to transmit zb-TAU requests due to its motion. The probability of a moving UE to transmit N=1, 2, . . . zb-TAUs after TsubS is estimated as shown in FIG. 9A. The previous threshold at T1 can be duplicated for additional zb-TAU requests. Using TsubN+1<TsubN and TsubN->0 as N->3, this threshold can be used to determine if a UE is in motion. FIG. 9B depicts UE 100, shown in phantom on the left, after it has been categorized as "moving". As UE 100 moves from left to right, its moving timer expires and UE 100 transmits a tb-TAU to TA A 200. UE 100 is categorized as stationary and given a TA_List including TA A 200. UE 100's motion then causes it to transmit a zb-TAU to TA B 210. In this example, the time between the tb-TAU and the zb-TAU is less than T1 (shown in FIG. 9A), and the system will keep the UE marked as stationary and download a TA_List including TA A 200 and TA B 210. UE 100's motion then causes it to transmit a second zb-TAU to TA C 212. In this example, the time between the tb-TAU and the second zb-TAU is greater than T2 (shown in FIG. 9A), and UE 100 is transitioned back to the moving state.

Figure 10:
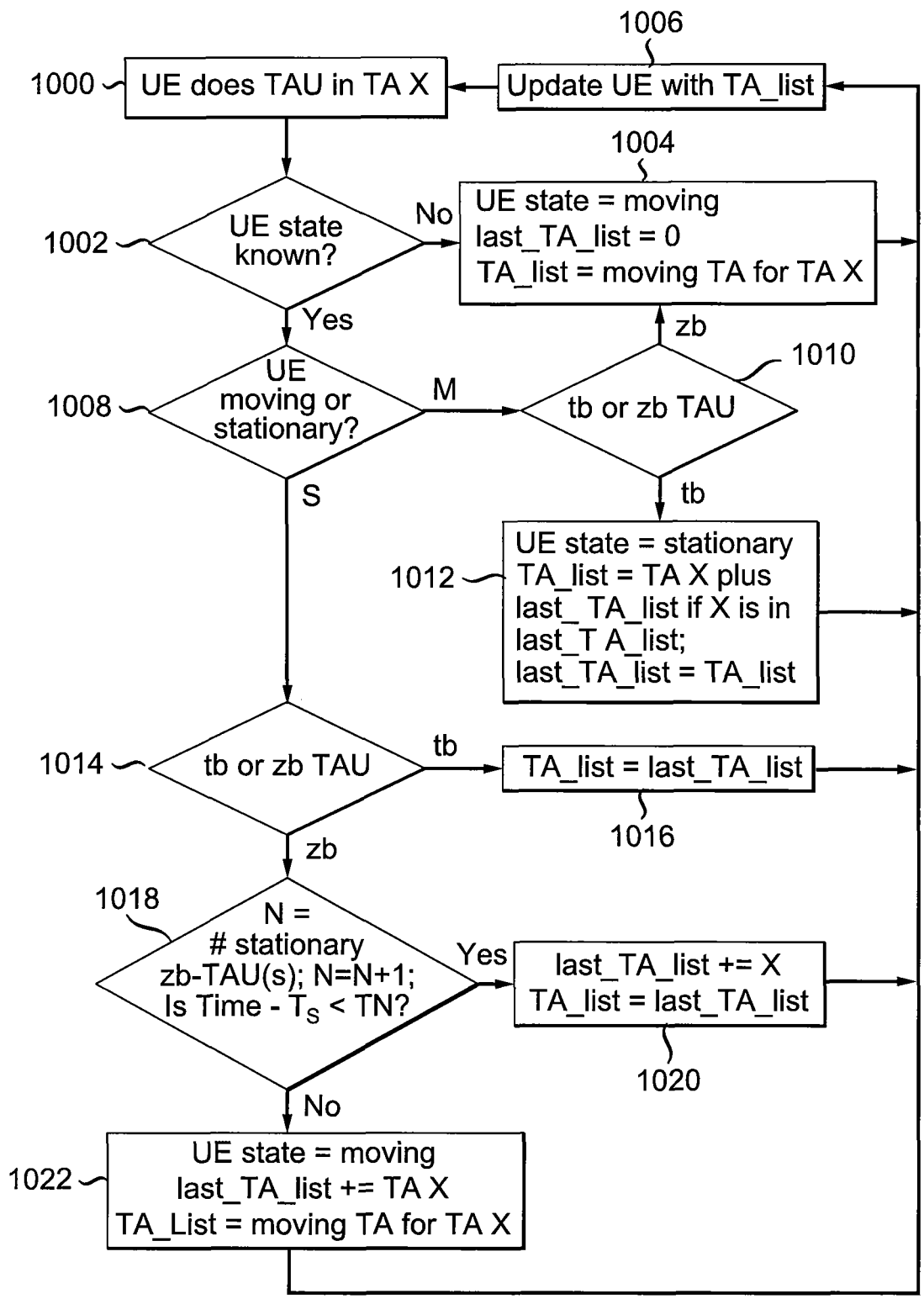
FIG. 10 depicts a flowchart of a method according to one embodiment.

FIG. 10 depicts a flow chart of a complete algorithm according to one embodiment. At step 1000, UE 100 transmits a TAU request while in a tracking area TA X. At step 1002, it is determined whether the categorization (also referred to as state) of UE 100 is known. It may not be possible to correctly categorize a UE for a variety of reasons. One reason is that the UE has just powered on, and there is not enough information available to categorize the UE. If the categorization of UE 100 is not known, the algorithm proceeds to step 1004 where the state of UE 100 is categorized as moving. Step 1004 also indicates that UE 100 is set to not have a previous TA-List as indicated by "last TA_List=0." At step 1004, a TA for a moving UE, specifically, TA X is indicated as the TA_List that should be transmitted to UE 100. The algorithm proceeds to step 1006 in which UE 100 is updated with a TA_List identified in step 1004 and provided with a value for a time based registration timer based on the categorization of UE 100 as moving in step 1004. The algorithm then returns to step 1000 and repeats.

If the state of UE 100 is known at step 1002, the algorithm proceeds to step 1008 where the current categorization of UE 100 is identified to be one of moving and stationary. If UE 100 is identified as being moving, the algorithm proceeds to step 1010 in which it is determined whether UE 100 transmitted a time based (tb) or zone based (zb) tracking area update (TAU) request. If UE 100 is determined to have transmitted a zone based TAU request, the algorithm proceeds to step 1004 described above. If UE 100 is determined to have transmitted a time based TAU (tb-TAU) request, the algorithm proceeds to step 1012. At step 1012, UE 100 is categorized as stationary. In addition, TA_List is set to include TA X and the stored Last_TA_List in response to a determination that TA X is included in Last_TA_List. After the TA_List is set, the Last_TA_List is set to the TA_List after modification as described. It should be noted that Last_TA_List, in one embodiment, includes all tracking areas listed in the TA_List stored and utilized by a UE when the UE was last categorized as stationary. The reason for this logic is to prevent a stationary UE from toggling between the moving and stationary state as previously described.

At step 1008, if UE 100 is identified as being categorized as stationary, the algorithm proceeds to step 1014 where the tracking area update request (TAU) from UE 100 is determined to be a time based (tb) or zone based (zb) request. If the TAU request from UE 100 is determined to be a tb-TAU request, the algorithm proceeds to step 1016 in which the TA_List is set to the Last_TA_List and the algorithm proceeds to step 1006 described above. If at step 1014 the TAU request from UE 100 is determined to be a zb-TAU request, the algorithm proceeds to step 1018. At step 1018, the variable N is equal to the number of zb-TAU requests received from UE 100 when categorized as stationary. Thus, at step 1018, N is incremented by one as indicated in step 1018 as "N=N+1". It is then determined whether (a) the time at which zb-TAU is received (i.e., Time shown in step 1018), less (b) the time at which UE 100 was categorized as stationary (i.e., TsubS shown in step 1018), is less than TN. If Time less TsubS is less than TN, the algorithm proceeds to step 1020 in which Last_TA_List has TA X added to it. TA_List is then set to the modified Last_TA_List. The algorithm then proceeds to step 1006 where an updated TA_List is transmitted to UE 100. If at step 1018 Time less TsubS is determined to be not less than TN, the algorithm proceeds to step 1022 in which the categorization of UE 100 is set to moving. Last_TA_List has TA X added to it. TA_List is set to a moving TA for TA X (e.g. a large registration area). The algorithm then proceeds to step 1006 where the updated TA_List is transmitted to UE 100.

It should be noted that the state of UE 100 (i.e., stationary or moving), tracking area lists (e.g. TA_List, Last_TA_List, etc.), and values related to timers (e.g. TsubS, TN) may be stored in UE 100 or MME 104 or both in various embodiments.

In one embodiment, an adaptive registration algorithm can be used to reduce the number of sectors paged per termination and the number of tracking area update requests. The tracking areas associated with a particular UE's moving and stationary states can be recorded in a database and used in a TA_List sent to the UE when categorized as moving or stationary. For example, a moving UE that consistently traverses a path will traverse the same tracking areas. Using information about the movement of the UE previously, a TA_List including all TAs the UE may communicate with while traversing a particular path can be transmitted to the UE. Then, when the UE traverses the particular path, the UE should not transmit any zb-TAU requests since all the TAs the UE will communicate with are contained in the TA_List. Similarly, as described above in connection with preventing a UE from cycling between moving and stationary, the TAs a UE is communication with when stationary at a particular location can be recorded and used to generate a TA_List for transmission to the UE when it is located at the particular location.

Figure 11:
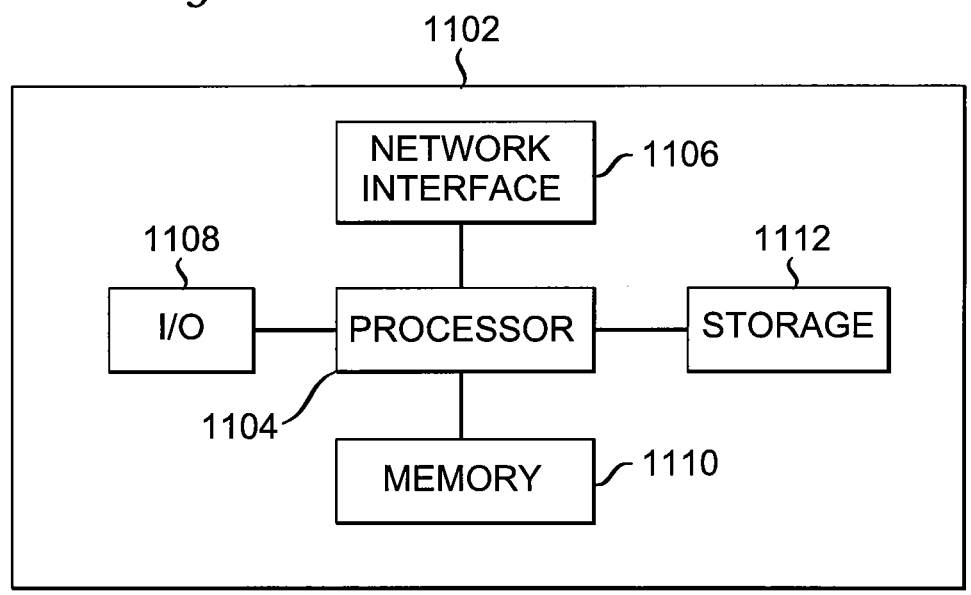
FIG. 11 is a high-level block diagram of a computer capable of implementing a mobility management entity.

MME 104 may be implemented on a computer to perform the methods of FIGS. 3 and 10. UE 100 may be similarly implemented on a computer. A high-level block diagram of such a computer is illustrated in FIG. 11. Computer 1102 contains a processor 1104 which controls the overall operation of the computer 1102 by executing computer program instructions which define such operation. The computer program instructions may be stored in a storage device 1112, or other computer readable medium (e.g., magnetic disk, CD ROM, etc.), and loaded into memory 1110 when execution of the computer program instructions is desired. Thus, the method steps of FIGS. 3 and 10 can be defined by the computer program instructions stored in the memory 1110 and/or storage 1112 and controlled by the processor 1104 executing the computer program instructions. For example, the computer program instructions can be implemented as computer executable code programmed by one skilled in the art to perform an algorithm defined by the method steps of FIGS. 3 and 10. Accordingly, by executing the computer program instructions, the processor 1104 executes an algorithm defined by the method steps of FIGS. 3 and 10. The computer 1102 also includes one or more network interfaces 1106 for communicating with other devices via a network. The computer 1102 also includes input/output devices 1108 that enable user interaction with the computer 1102 (e.g., display, keyboard, mouse, speakers, buttons, etc.) One skilled in the art will recognize that an implementation of an actual computer could contain other components as well, and that FIG. 11 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method for registration of a mobile communication device comprising:
   receiving a tracking area update request from the mobile communication device;
   determining if the mobile communication device is categorized as one of moving and stationary;
   categorizing the mobile communication device as one of moving and stationary based on the tracking area update request;
   transmitting a tracking area list and a timer value to the mobile communication device, the tracking area list and the timer value based on the tracking area update request and the categorizing, the timer value identifying an interval after which a time based tracking area update request is to be sent from the mobile communications device.

2. The method of claim 1, wherein the tracking area list identifies a plurality of network nodes, the plurality of network nodes based on the categorizing.

3. The method of claim 1, wherein the tracking area list and the timer value are further based on a time period from a previous categorization of the mobile communications device to a time the tracking area update request was received.

4. The method of claim 1, wherein the categorizing the mobile communication device is further based on a previous categorization of the mobile communication device.

5. The method of claim 3, wherein the tracking area list is further based on a previous tracking area list transmitted to the mobile communication device.

6. The method of claim 1, wherein the tracking area list is further based on a path previously traversed by the mobile communications device.

7. The method of claim 1, wherein the timer value is further based on an average time for a particular mobile communication device to travel to a border of a large registration area in which the mobile communication device is located.

8. A mobility management entity for registration of a mobile communications device comprising:
   a receiver configured to receive a tracking area update request from the mobile communication device; and
   a processor configured to:
   determine if the mobile communication device is categorized as one of moving and stationary;
   categorize the mobile communication device as one of moving and stationary based on the tracking area update request;
   transmit a tracking area list and a timer value to the mobile communication device, the tracking area list and the timer value based on the tracking area update request and the categorization, the timer value identifying an interval after which a time based tracking area update request is to be sent from the mobile communications device.

9. The mobility management entity of claim 8, wherein the tracking area list identifies a plurality of network nodes, the plurality of network nodes based on the categorization.

10. The mobility management entity of claim 8, wherein the tracking area list and the timer value are further based on a time period from a previous categorization of the mobile communications device to a time the tracking area update request was received.

11. The mobility management entity of claim 8, wherein the categorizing the mobile communication device is further based on a previous categorization of the mobile communication device.

12. The mobility management entity of claim 10, wherein the tracking area list is further based on a previous tracking area list transmitted to the mobile communication device.

13. The mobility management entity of claim 8, wherein the tracking area list is further based on a path previously traversed by the mobile communications device.

14. The mobility management entity of claim 8, wherein the timer value is further based on an average time for a particular mobile communication device to travel to a border of a large registration area in which the mobile communication device is located.

15. A non-transitory computer-readable medium having instructions stored thereon, the instructions for registration of a mobile communications device, the instructions in response to execution by a computing device cause the computing device to perform operations comprising:
   receiving a tracking area update request from the mobile communication device;
   determining if the mobile communication device is categorized as one of moving and stationary;
   categorizing the mobile communication device as one of moving and stationary based on the tracking area update request;
   transmitting a tracking area list and a timer value to the mobile communication device, the tracking area list and the timer value based on the tracking area update request and the categorizing, the timer value identifying an interval after which a time based tracking area update request is to be sent from the mobile communications device.

16. The non-transitory computer-readable medium of claim 15, wherein the tracking area list identifies a plurality of network nodes, the plurality of network nodes based on the categorizing.

17. The non-transitory computer-readable medium of claim 15, wherein the tracking area list and the timer value are further based on a time period from a previous categorization of the mobile communications device to a time the tracking area update request was received.

18. The non-transitory computer-readable medium of claim 15, wherein the categorizing the mobile communication device is further based on a previous categorization of the mobile communication device.

19. The non-transitory computer-readable medium of claim 17, wherein the tracking area list is further based on a previous tracking area list transmitted to the mobile communication device.

20. The non-transitory computer-readable medium of claim 15, wherein the tracking area list is further based on a path previously traversed by the mobile communications device.

21. The non-transitory computer-readable medium of claim 15, wherein the timer value is further based on an average time for a particular mobile communication device to travel to a border of a large registration area in which the mobile communication device is located.

* * * * *